US008625008B2

(12) United States Patent
Hisa (10) Patent No.: US 8,625,008 B2
(45) Date of Patent: Jan. 7, 2014

(54) IMAGE PROCESSING APPARATUS HAVING LUMINANCE-TYPE GAMMA CORRECTION CIRCUIT CAPABLE OF CHANGING NONLINEAR CHARACTERISTIC, AND IMAGE PROCESSING METHOD THEREFOR

(75) Inventor: Kenzo Hisa, Inagi (JP)

(73) Assignee: Canon Kabushiki Kaisha (JP)

( * ) Notice: Subject to any disclaimer, the term of this patent is extended or adjusted under 35 U.S.C. 154(b) by 56 days.

(21) Appl. No.: 13/302,545

(22) Filed: Nov. 22, 2011

(65) Prior Publication Data

US 2012/0133806 A1 May 31, 2012

(30) Foreign Application Priority Data

Nov. 30, 2010 (JP) ................................. 2010-266975

(51) Int. Cl.
*H04N 5/202* (2006.01)
*H04N 5/20* (2006.01)

(52) U.S. Cl.
USPC .......................................... 348/254; 348/255

(58) Field of Classification Search
USPC ......... 348/234, 242, 253, 254, 674, 675, 687, 348/385, 519; 382/169, 274; 345/83–98, 345/204–215, 600, 690–699
See application file for complete search history.

(56) References Cited

U.S. PATENT DOCUMENTS

| 7,474,303 | B2 * | 1/2009 | Shin et al. ...................... 345/204 |
| 2005/0219259 | A1 * | 10/2005 | Gonsalves et al. ............ 345/593 |
| 2005/0276471 | A1 * | 12/2005 | Shin et al. ...................... 382/162 |
| 2006/0158564 | A1 * | 7/2006 | Miyazawa ..................... 348/650 |
| 2009/0033682 | A1 * | 2/2009 | Kaida et al. ..................... 345/634 |
| 2009/0290068 | A1 * | 11/2009 | Abe et al. ....................... 348/649 |

FOREIGN PATENT DOCUMENTS

JP           2001045308 A      2/2001

* cited by examiner

*Primary Examiner* — Tuan Ho
*Assistant Examiner* — Chan Nguyen
(74) *Attorney, Agent, or Firm* — Rossi, Kimms & McDowell LLP

(57) ABSTRACT

An image processing apparatus is provided in which, even if a nonlinear characteristic of a luminance-type gamma correction circuit for converting a luminance signal is changed, saturation with respect to a luminance output can be nearly constant. A signal amount of the luminance signal generated from image data that exceeds a previously defined threshold is calculated. A first nonlinear characteristic is selected from a plurality of nonlinear characteristics previously set depending on the calculated signal amount. Nonlinear conversation is performed on a signal generated from the image data to determine luminance with the selected first nonlinear characteristic. An output ratio of the first nonlinear characteristic to a second nonlinear characteristic is prepared and the second nonlinear characteristic is defined so that the output ratio is satisfied. Nonlinear conversion is performed on a signal that has been generated from the image data to determine saturation with the selected second nonlinear characteristic.

4 Claims, 9 Drawing Sheets

IMAGE PROCESSING APPARATUS HAVING LUMINANCE-TYPE GAMMA CORRECTION CIRCUIT CAPABLE OF CHANGING NONLINEAR CHARACTERISTIC, AND IMAGE PROCESSING METHOD THEREFOR

BACKGROUND OF THE INVENTION

1. Field of the Invention

The present invention relates to an image processing apparatus having a luminance-type gamma correction circuit capable of changing a nonlinear characteristic, and an image processing method therefor, and more particularly, to an image processing apparatus in which a variation of saturation occurring when the nonlinear characteristic of the luminance-type gamma correction circuit is changed is suppressed and an image processing method therefor.

2. Description of the Related Art

In an image pickup apparatus such as a digital video camera, image processing is performed for an output signal from an image pickup element to generate a video, then the video is outputted to a monitor or the like. Since the monitor has a gamma characteristic, an image processor of performing the image processing includes a gamma correction circuit for correcting the gamma characteristic of the monitor. Here, when correction of an inverse gamma characteristic of the monitor is performed with respect to a luminance signal, the luminance signal of the monitor output video generally linearly varies with respect to an incident light.

However, in a state with an appropriate exposure, when the correction is performed with the inverse gamma characteristic of the monitor, a dynamic range becomes low, and over exposure occurs in relatively-low luminance parts of a high-luminance portion. This does not cause a problem for a low-contrast subject, but does cause a problem of increasing over exposure parts in a video of the high-luminance portion when a contrast becomes high. Consequently, there is known a method of setting a slope of a nonlinear characteristic in the gamma correction of the high-luminance portion to be smaller than that of the inverse gamma characteristic of the monitor, and furthermore giving a gradation to a signal of the high-luminance portion. According to this method, while a gradation expression in the high-luminance portion becomes low, a video having higher luminance can be expressed.

However, if a color-difference signal is generated by using a signal processed with such a nonlinear characteristic, a shift occurs with respect to the inverse gamma characteristic of the monitor, and thus a hue shift occurs. Consequently, there is a proposed approach in which gamma correction circuits for luminance and for color are separately provided, and a luminance signal and a color signal are generated from signals corrected with different nonlinear characteristics.

Moreover, an approach for generating an output signal obtained by the gamma correction of the color signal, with the number of bits larger than that of an output signal obtained by the gamma correction of the luminance signal has been invented (see Japanese Laid-Open Patent Publication (Kokai) No. 2001-45308). In this method, since the color signal is generated with a signal that is not suppressed in the high-luminance portion, a color shift or decolorization in the high-luminance portion is improved.

Furthermore, there is a known approach for detecting a signal amount of the high-luminance portion in the video, and changing gradation of the high-luminance portion depending on the detected signal amount. In this approach, the nonlinear characteristic for the gamma correction for the luminance is varied depending on the signal amount of the high-luminance portion. For example, if the signal amount of the high-luminance portion is large, the slope of the high-luminance portion is decreased in a property of the gamma correction. However, instead of it, the gradation expression is performed for a further higher-luminance portion.

In the above described approach for changing the gradation of the high-luminance portion depending on the signal amount of the high-luminance portion in the video, the saturation may vary along with the change of the nonlinear characteristic. Even for the same subject, the variation of the saturation can occur depending on the signal amount of the high-luminance portion.

SUMMARY OF THE INVENTION

The present invention provides an image processing apparatus in which, even if a nonlinear characteristic of a luminance-type gamma correction circuit for converting a luminance signal is changed, saturation with respect to a luminance output can be nearly constant and an image processing method therefor.

In a first aspect of the present invention, there is provided an image processing apparatus, comprising a first nonlinearization unit adapted to perform nonlinear conversion of a signal that has been generated from image data and determines luminance, with a first nonlinear characteristic, a second nonlinearization unit adapted to perform nonlinear conversion of a signal that has been generated from the image data and determines saturation, with a second nonlinear characteristic, and a control unit adapted to set the first nonlinear characteristic and the second nonlinear characteristic to the first nonlinearization unit and the second nonlinearization unit, respectively, wherein the control unit is adapted to previously prepare the first nonlinear characteristic set to the first nonlinearization unit, and an output ratio of the first nonlinear characteristic with respect to an output of the signal that has been generated from the image data and determines the luminance, to the second nonlinear characteristic with respect to an output of the signal that has been generated from the image data and determines the saturation, and to define the second nonlinear characteristic to be set to the second nonlinearization unit so that the output ratio is satisfied.

According to the present invention, even if the nonlinear characteristic of the luminance-type gamma correction circuit for converting the luminance signal is changed, the saturation for each output luminance level can be nearly constant.

The above and other objects, features, and advantages of the invention will become more apparent from the following detailed description taken in conjunction with the accompanying drawings.

DESCRIPTION OF THE EMBODIMENTS

The present invention will now be described in detail with reference to the drawings showing preferred embodiments thereof. It should be noted that the relative arrangement of the components, the numerical expressions and numerical values set forth in these embodiments do not limit the scope of the present invention unless it is specifically stated otherwise.

<First Embodiment>

Figure 1:
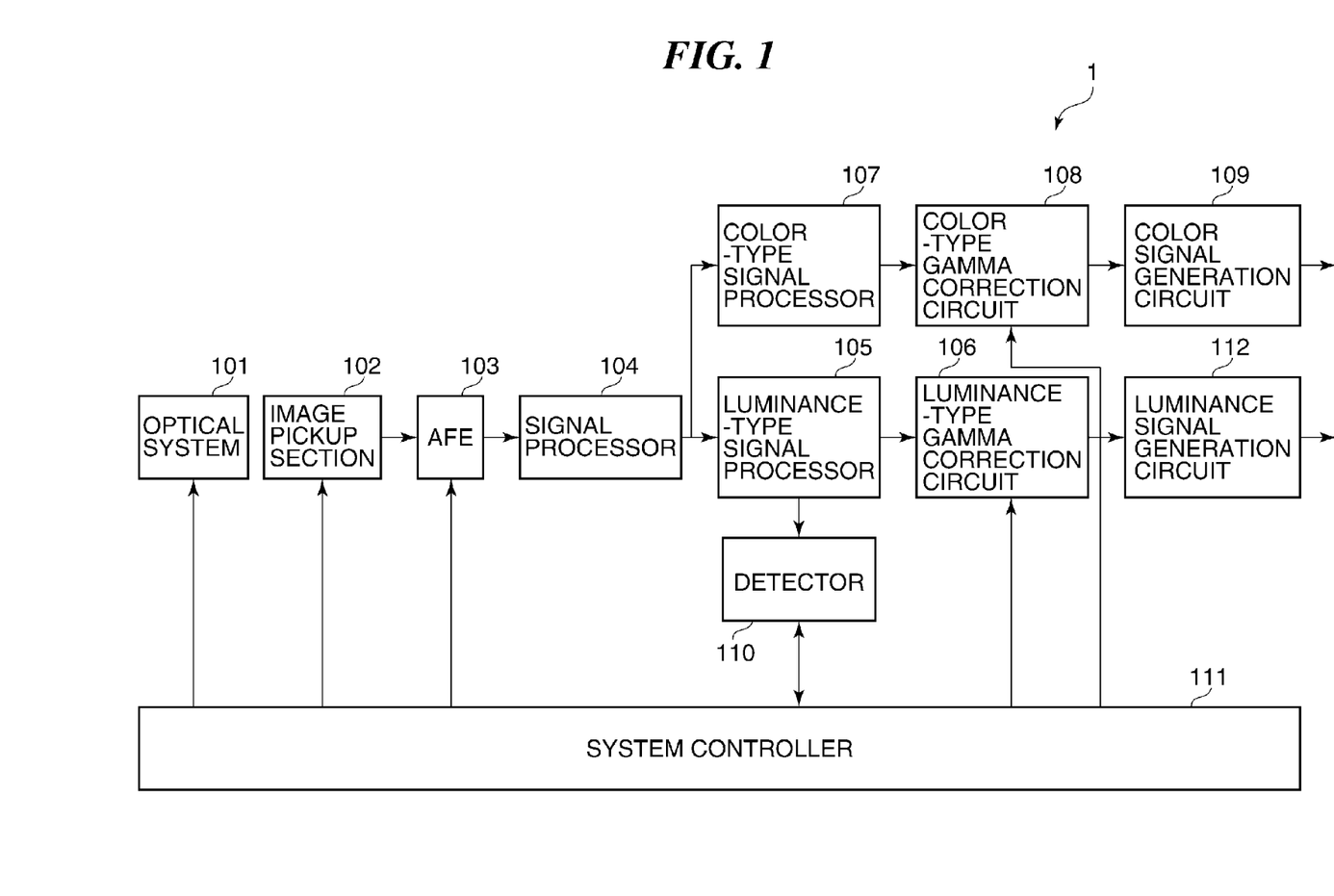
FIG. 1 is a block diagram showing a schematic configuration of a digital video camera according to a first embodiment.

FIG. 1 is a block diagram showing a schematic configuration of a digital video camera 1 according to a first embodiment. In FIG. 1, the digital video camera 1 consists of an optical system 101, an image pickup section 102, an analog front end (AFE) 103, a signal processor 104, a luminance-type signal processor 105, and a luminance-type gamma correction circuit 106 that functions as a first nonlinearization unit. Moreover, the digital video camera 1 includes a color-type signal processor 107, a color-type gamma correction circuit 108 that functions as a second nonlinearization unit, a color signal generation circuit 109, a detector 110 and a system controller 111. The system controller 111 controls the optical system 101, the image pickup section 102, the AFE 103, the luminance-type gamma correction circuit 106, the color-type gamma correction circuit 108, and the detector 110, and obtains a detection signal from the detector 110.

The optical system 101 includes an iris, a lens, and the like. The image pickup section 102 includes an image pickup element such as a CMOS image sensor or a CCD image sensor, a timing generator (TG), and the like. When a subject (not shown) is shot by the digital video camera 1, a light that has passed through the optical system 101 is imaged onto the image pickup element of the image pickup section 102. The image pickup element photoelectrically converts a subject image obtained by the imaging, and outputs the converted subject image as an analog image signal. It should be noted that this analog image signal is outputted from the image pickup section 102 at a shutter speed defined by the system controller 111.

The AFE 103 converts the analog image signal outputted from the image pickup section 102, into a digital image signal (hereinafter referred to as "image data") through analog/digital (A/D) conversion, and transmits the converted image data to the signal processor 104. The signal processor 104 performs black level correction, white balance adjustment, and the like for received image data, and transmits each processed image data of red (R), green (G) and blue (B) to the luminance-type signal processor 105 and the color-type signal processor 107.

In the luminance-type signal processor 105, a low-pass filter process and an edge correction process are performed, and each processed image data of RGB is transmitted to the luminance-type gamma correction circuit 106. The luminance-type gamma correction circuit 106 performs nonlinear conversion of the above described each image data of RGB, and outputs the converted each image data of RGB. The image data that has passed through processing in the luminance-type gamma correction circuit 106 is transmitted to a luminance signal generation circuit 112, where a luminance signal Y is generated from each signal of R, G and B.

The color-type signal processor 107 corrects black and color balances. The image data that has passed through processing in the color-type signal processor 107 and determines saturation is transmitted to the color-type gamma correction circuit 108, where signal correction through the nonlinear conversion is performed for each signal of RGB. The image data that has passed through processing in the color-type gamma correction circuit 108 is transmitted to the color signal generation circuit 109, where color-difference signals Pr and Pb are generated from each signal of R, G and B. In this way, the image data (image signal) that is inputted to the color-type signal processor 107 and outputted from the color signal generation circuit 109 is processed as the image data that determines the saturation of the image.

The detector 110 generates a luminance signal from the image data, based on a frame and a threshold that are set by the system controller 111, and obtains an evaluation value for exposure control and an evaluation value of a high-luminance signal, based on this generated luminance signal. The evaluation value for the exposure control is, for example, a value representing an exposure of a current video, such as an average value of entire image data of one frame, and is transmitted from the detector 110 to the system controller 111.

The system controller 111 transmits signals to the optical system 101, the image pickup section 102, and the AFE 103 so that the evaluation value for the exposure control becomes a target value, and controls the iris, a shutter, and a gain. The evaluation value of the high-luminance signal is a value representing to what degree a signal of a high-luminance portion exists in the entire image data, and for example, a signal amount (a value of an integral) of the luminance signal exceeding a previously defined threshold is used. Accordingly, if the evaluation value of the high-luminance signal is large, it shows that many high-luminance portions exist in the image data. Similarly to the evaluation value for the exposure control, the evaluation value of the high-luminance signal is transmitted from the detector 110 to the system controller 111.

The system controller 111 sets, based on the evaluation value of the high-luminance signal, a nonlinear characteristic (first nonlinear characteristic) with which the luminance-type gamma correction circuit 106 performs the nonlinear conversion, and a nonlinear characteristic (second nonlinear characteristic) with which the color-type gamma correction circuit 108 performs the nonlinear conversion.

Figure 9:
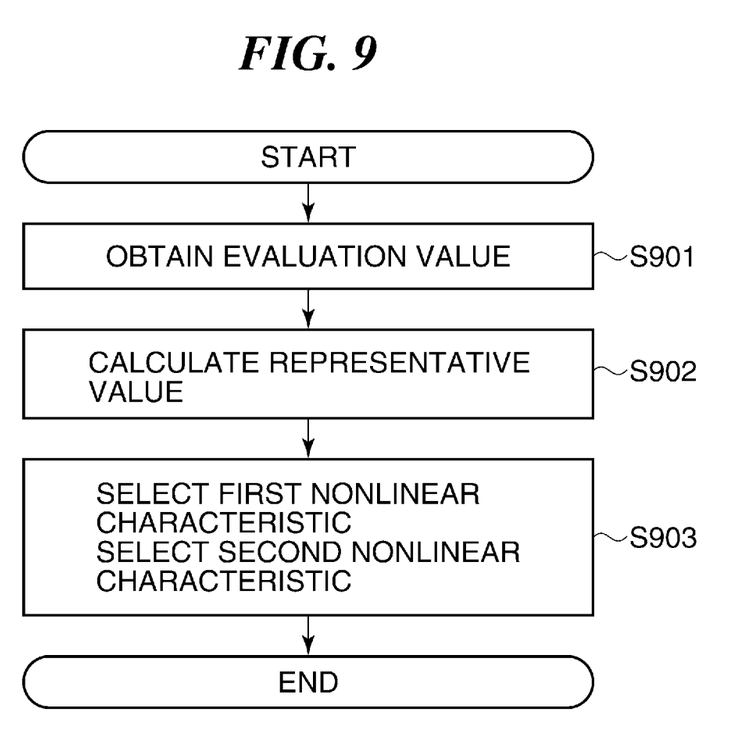
FIG. 9 is a flowchart showing a procedure of a nonlinear characteristic determination method according to the first embodiment.

FIG. 9 is a flowchart showing a procedure of a nonlinear characteristic determination method in the first embodiment. Hereinafter, the nonlinear characteristic determination method will be described according to the flowchart. The system controller 111 obtains the evaluation value of the high-luminance signal from the detector 110 (step S901), and calculates a representative value according to the evaluation value (step S902). Hereinafter, a method of calculating this representative value will be described with reference to FIG. 2.

Figure 2:
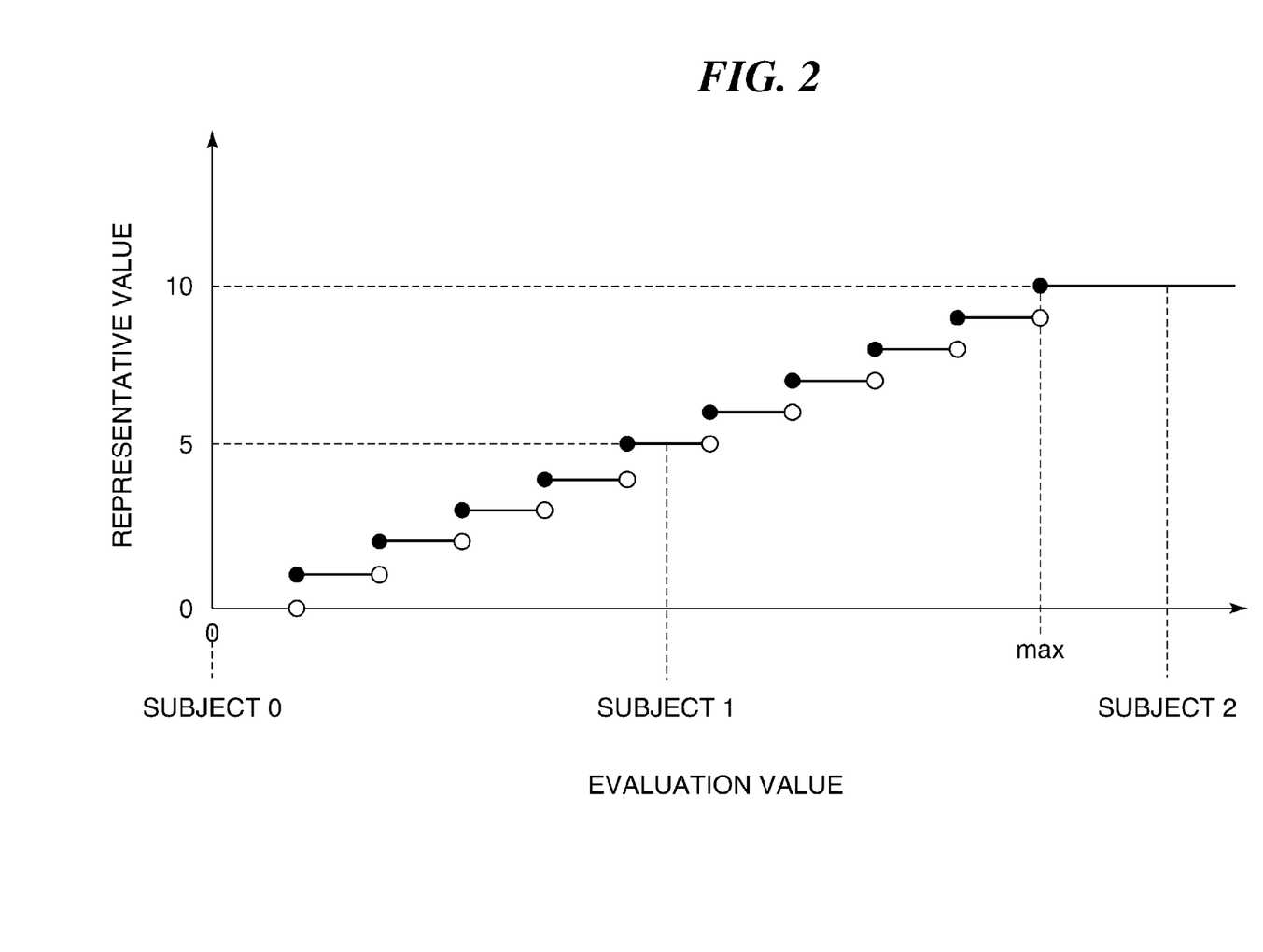
FIG. 2 is a diagram showing a relationship between an evaluation value of a high-luminance signal obtained by a detector of the digital video camera of FIG. 1, and a representative value used for selecting a nonlinear characteristic.

FIG. 2 is a diagram showing a relationship between the evaluation value of the high-luminance signal obtained by the detector 110 of the digital video camera 1 of FIG. 1, and the representative value used for selecting the nonlinear characteristic. The larger the evaluation value is, the larger the representative value becomes. The representative value is decided by the number of previously prepared nonlinear characteristics. In the present embodiment, it is assumed that 11 kinds of nonlinear characteristics are prepared. The representative value and the nonlinear characteristic are previously associated with each other, and the larger the representative value becomes, the higher luminance of an expressed gradation in the nonlinear characteristic becomes. As shown in FIG. 2, if the evaluation value of the high-luminance signal exceeds a maximum value (max), the representative value is fixed to "10". As shown in FIG. 2, if evaluation values of subjects 0, 1 and 2 are obtained, the representative values are set to 0, 5 and 10, respectively. It should be noted that the same nonlinear characteristic is given to each signal of RGB inputted to and outputted from the luminance-type gamma correction circuit 106.

Returning to FIG. 9, next, according to the representative value calculated in step S902, the first nonlinear characteristic to be set to the luminance-type gamma correction circuit 106, and the second nonlinear characteristic to be set to the color-type gamma correction circuit 108 are selected (step S903), and this process is completed. According to this process, the selected nonlinear characteristics are set to the luminance-type gamma correction circuit 106 and the color-type gamma correction circuit 108. Then, the set nonlinear characteristic is used to output Y from the luminance-type gamma correction circuit 106. Moreover, an output of the color-type gamma correction circuit 108 is transmitted to the color signal generation circuit 109, where Pr and Pb are outputted. For the nonlinear characteristics, nonlinear characteristics of a luminance-type and a color-type have been defined according to the representative value. Hereinafter, the nonlinear characteristic determination method will be described while the nonlinear characteristics are shown.

Figure 3:
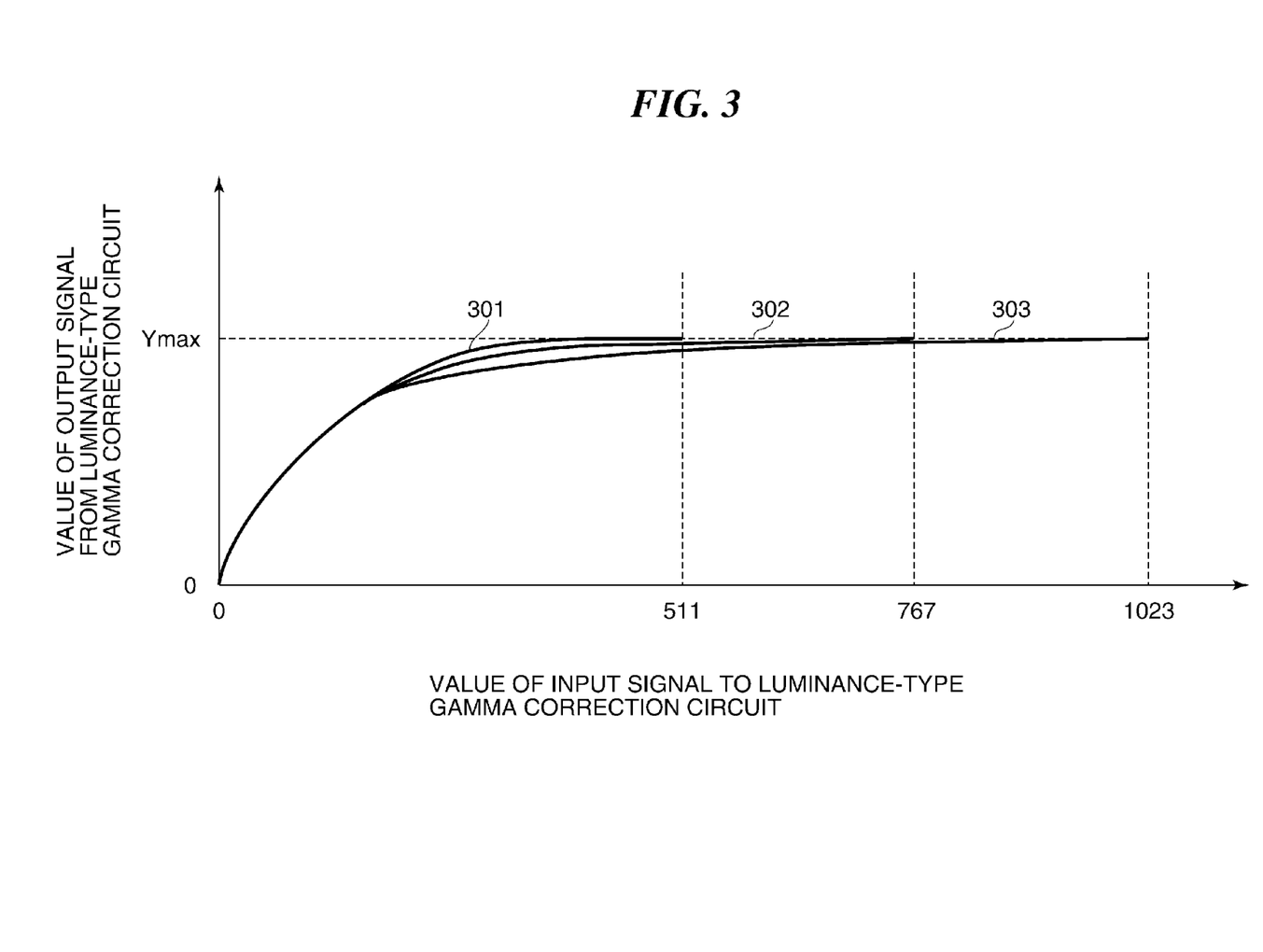
FIG. 3 is a diagram showing an example of nonlinear characteristics to be set to a luminance-type gamma correction circuit of the digital video camera of FIG. 1.

FIG. 3 is a diagram showing an example of the nonlinear characteristics to be set to the luminance-type gamma correction circuit 106 of the digital video camera 1 of FIG. 1, and shows a nonlinear characteristic 301, a nonlinear characteristic 302 and a nonlinear characteristic 303 that have been previously prepared for the representative value 0, the representative value 5 and the representative value 10 shown in FIG. 2. In the nonlinear characteristic 301 prepared for the representative value 0, a gradation of an output signal from the luminance-type gamma correction circuit 106 occurs with respect to an input signal of an input value up to 511 from the luminance-type signal processor 105 to the luminance-type gamma correction circuit 106. In the nonlinear characteristic 303 prepared for the representative value 10, the gradation of the output signal occurs with respect to the input signal of the input value up to 1023. In the nonlinear characteristic 302 prepared for the representative value 5, the gradation of the output signal occurs with respect to the input signal of the input value up to 767 that is intermediate between these input values.

As in a case of the representative value 0, if the evaluation value of the high-luminance signal is small, the nonlinear characteristic 301 is selected, and the output signal from the luminance-type gamma correction circuit 106 at a time when the input value of the input signal from the luminance-type signal processor 105 is up to 511 is expressed with good gradation. On the other hand, like the representative value 10, if the evaluation value of the high-luminance signal is large, the nonlinear characteristic 303 is selected, and the output signal from the luminance-type gamma correction circuit 106 at a time when the input value of the input signal from the luminance-type signal processor 105 is higher than 511 is expressed with the good gradation.

Figure 4:
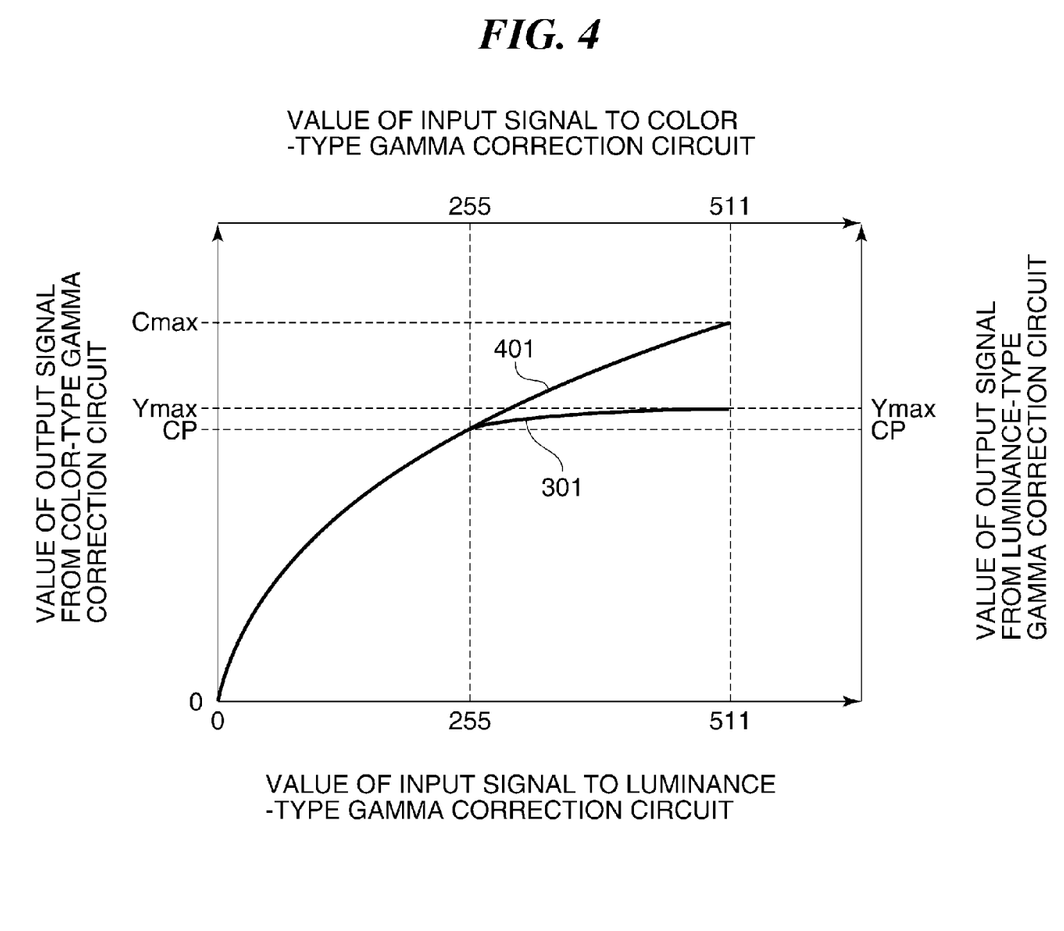
FIG. 4 is a diagram showing an example of a relationship between the nonlinear characteristic to be set to the luminance-type gamma correction circuit, and a nonlinear characteristic to be set to a color-type gamma correction circuit of the digital video camera of FIG. 1.

In the digital video camera 1, the nonlinear characteristic to be set in the color-type gamma correction circuit 108 has also been previously prepared for the above described plurality of representative values. FIG. 4 is a diagram showing a relationship between the nonlinear characteristic to be set to the luminance-type gamma correction circuit 106, and the nonlinear characteristic to be set to the color-type gamma correction circuit 108, in the case of the representative value 0. The nonlinear characteristic 301 shown in FIG. 4 is the same as the nonlinear characteristic 301 shown in FIG. 3. In other words, with respect to the nonlinear characteristic 301 of FIG. 4, its x-axis represents the value of the input signal to the luminance-type gamma correction circuit 106, and its y-axis represents a value of the output signal from the luminance-type gamma correction circuit 106. Moreover, with respect to a nonlinear characteristic 401 of FIG. 4, its x-axis indicates a value of an input signal to the color-type gamma correction circuit 108, and its y-axis indicates a value of an output signal from the color-type gamma correction circuit 108. It should be noted that, similarly to the luminance-type gamma correction circuit 106, the same nonlinear characteristic is given to each signal of RGB inputted to and outputted from the color-type gamma correction circuit 108.

The nonlinear characteristic to be set to the color-type gamma correction circuit 108 is defined as follows. Specifically, first, a reference output ratio of luminance to color is defined. The nonlinear characteristic 401 shown in FIG. 4 is a nonlinear characteristic to be set to the color-type gamma correction circuit 108 if the representative value 0 is selected. In the present embodiment, the nonlinear characteristic 401 has a characteristic close to an inverse gamma characteristic of a monitor. The nonlinear characteristic 301 to be set to the luminance-type gamma correction circuit 106 and the nonlinear characteristic 401 to be set to the color-type gamma correction circuit 108 have a similar characteristic until both the value of the output signal from the luminance-type gamma correction circuit 106 and the value of the output signal from the color-type gamma correction circuit 108 become CP.

Figure 5:
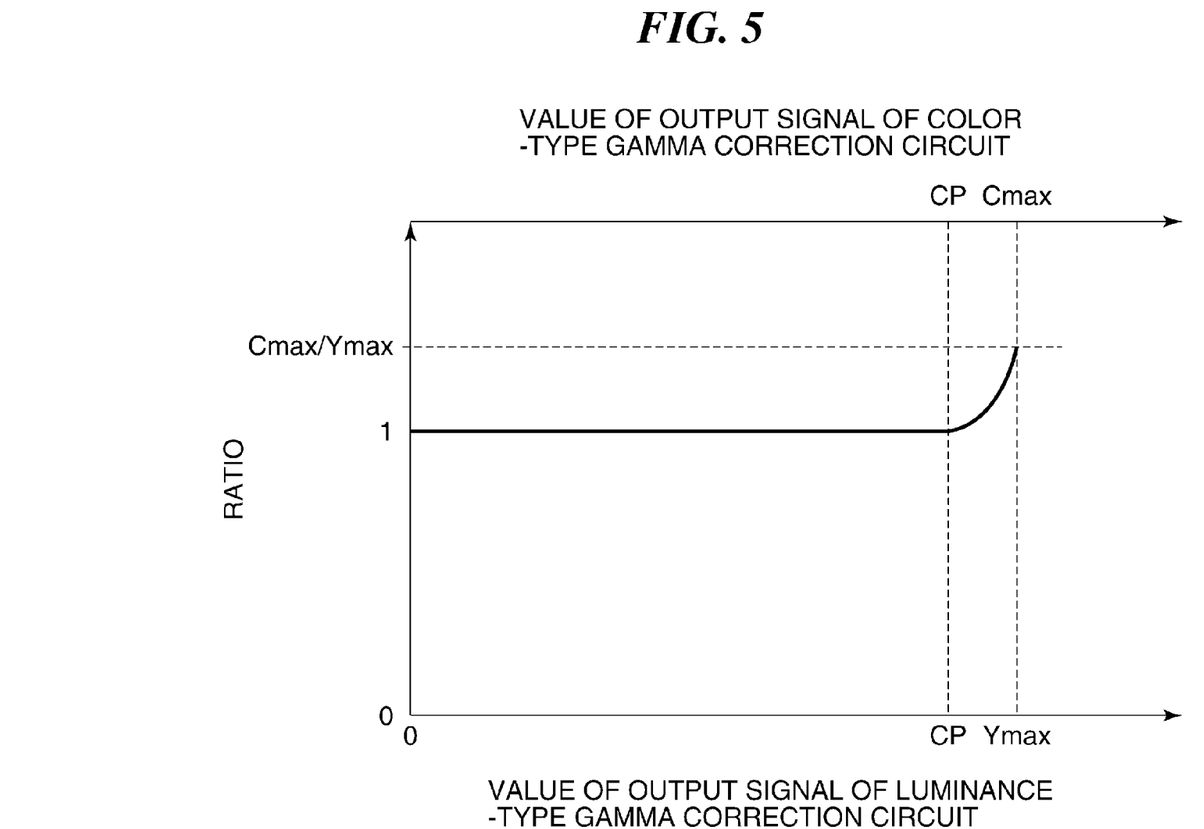
FIG. 5 is a diagram showing an example of a relationship of a ratio of the nonlinear characteristic to be set to the color-type gamma correction circuit to the nonlinear characteristic to be set to the luminance-type gamma correction circuit, with respect to an output from the luminance-type gamma correction circuit.

FIG. 5 is a diagram showing a relationship of a ratio (output ratio) of the nonlinear characteristic to be set to the color-type gamma correction circuit 108 to the nonlinear characteristic to be set to the luminance-type gamma correction circuit 106, with respect to the output signal from the luminance-type gamma correction circuit 106 (the nonlinear characteristic to be set to the luminance-type gamma correction circuit 106). The output ratio becomes 1.0 times until both the value of the output signal from the luminance-type gamma correction circuit 106 and the value of the output signal from the color-type gamma correction circuit 108 become CP. Moreover, the output ratio becomes Cmax/Ymax when the value of the output signal from the luminance-type gamma correction circuit 106 become Ymax. The system controller 111 determines the nonlinear characteristic to be set to the color-type gamma correction circuit 108, from the nonlinear characteristic to be set to the luminance-type gamma correction circuit 106, and the output ratio of FIG. 5.

Figure 6:
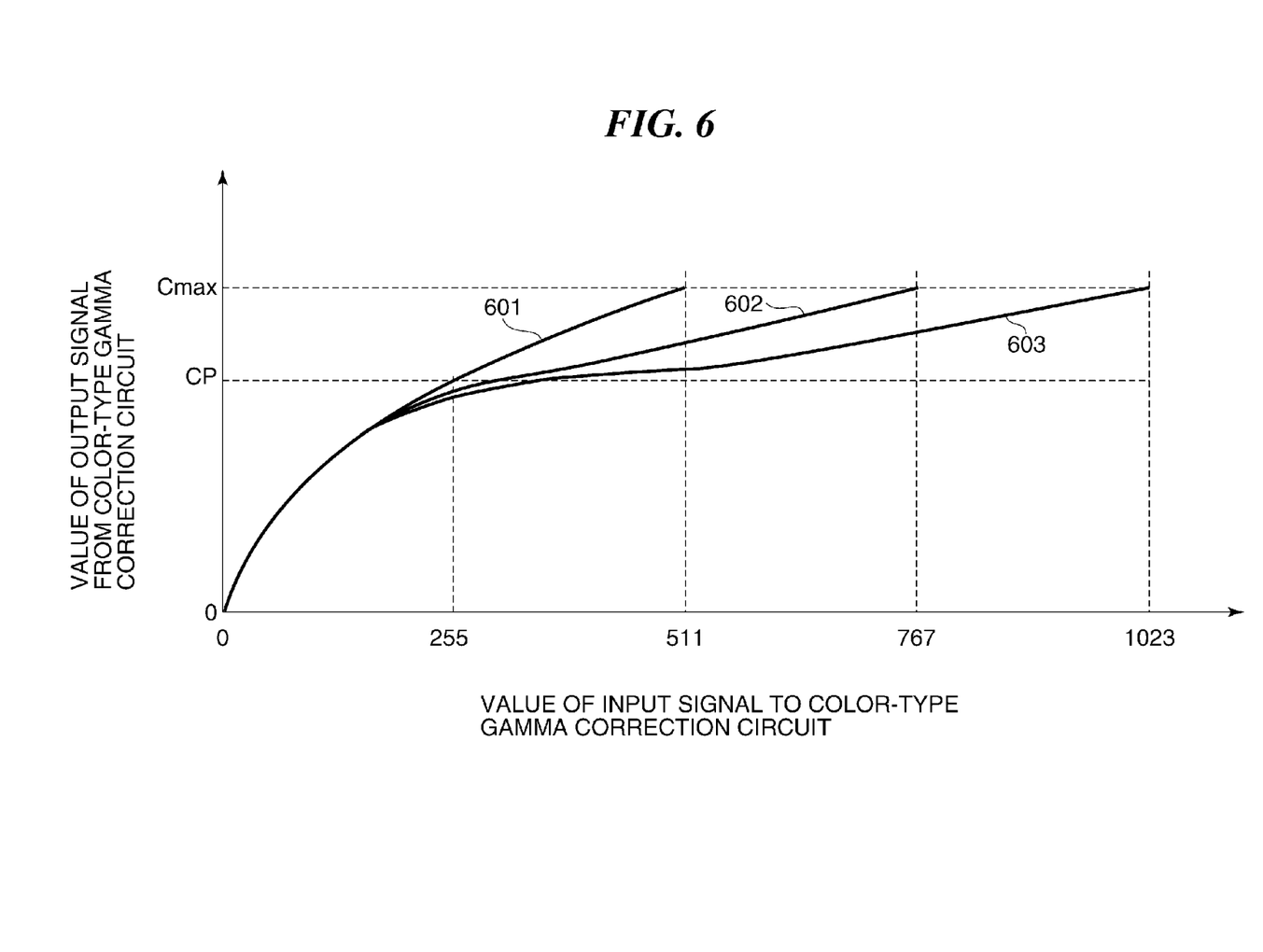
FIG. 6 is a diagram showing the nonlinear characteristics to be set to the color-type gamma correction circuit, which are determined with respect to the nonlinear characteristics to be set to the luminance-type gamma correction circuit of FIG. 3.

FIG. 6 is a diagram showing the nonlinear characteristics to be set to the color-type gamma correction circuit 108, which are determined with respect to the nonlinear characteristics 301, 302 and 303 to be set to the luminance-type gamma correction circuit 106 as shown in FIG. 3. Nonlinear characteristics 601, 602 and 603 shown in FIG. 6 are the nonlinear characteristics to be set to the color-type gamma correction circuit 108, and have been previously prepared for the representative values 0, 5 and 10 shown in FIG. 2, respectively. The nonlinear characteristics 601, 602 and 603 have been defined so that all of a ratio of the nonlinear characteristic 301 to the nonlinear characteristic 601, a ratio of the nonlinear characteristic 302 to the nonlinear characteristic 602, and a ratio of the nonlinear characteristic 303 to the nonlinear characteristic 603 satisfy the relationship of FIG. 5.

For example, in a case of the subject 0 shown in FIG. 2, the nonlinear characteristic 301 of FIG. 3 is set to the luminance-type gamma correction circuit 106, and the nonlinear characteristic 601 is set to the color-type gamma correction circuit 108. It should be noted that, in the case of the present embodiment, the nonlinear characteristic 601 of FIG. 6 becomes equivalent to the nonlinear characteristic 401 shown in FIG. 4. Similarly, in a case of the subject 1 shown in FIG. 2, the nonlinear characteristic 302 is set to the luminance-type gamma correction circuit 106, and the nonlinear characteristic 602 is set to the color-type gamma correction circuit 108. Moreover, in a case of the subject 2 shown in FIG. 2, the nonlinear characteristic 303 is set to the luminance-type gamma correction circuit 106, and the nonlinear characteristic 603 is set to the color-type gamma correction circuit 108.

In this way, in the present embodiment, the system controller 111 changes the nonlinear characteristics to be set to the luminance-type gamma correction circuit 106 and the color-type gamma correction circuit 108, depending on the evaluation value of the high-luminance signal that indicates the signal amount (the value of the integral) of the luminance signal that exceeds the previously defined threshold and has been generated by the detector 110. In other words, depending on the evaluation value of the high-luminance signal, the system controller 111 selects the nonlinear characteristic to be set to the luminance-type gamma correction circuit 106, from a plurality of nonlinear characteristics that have been previously prepared as the representative value 0 to the representative value 10. Then, from the nonlinear characteristic set to the luminance-type gamma correction circuit 106, and the output ratio of FIG. 5, the nonlinear characteristic to be set to the color-type gamma correction circuit 108 is determined so that this output ratio is satisfied.

Since the nonlinear characteristic used in the nonlinear conversion in the color-type gamma correction circuit 108 is set by the method as described above, saturation with respect to a luminance output can be nearly constant when the nonlinear characteristic of the luminance-type gamma correction circuit 106 is varied, and a variation of the saturation can be reduced.

<Second Embodiment>

In the first embodiment, the nonlinear characteristic for the nonlinear conversion in the color-type gamma correction circuit 108 is varied corresponding to the nonlinear characteristic for the nonlinear conversion in the luminance-type gamma correction circuit 106, and a color signal is generated with the output signal from the color-type gamma correction circuit 108. Here, for example, in a case of the nonlinear characteristic 601 shown in FIG. 6, few color shifts occur because of closeness to the inverse gamma characteristic of the monitor. However, in cases of the nonlinear characteristics 602 and 603, a hue shift occurs for an amount of deviation from the inverse gamma characteristic of the monitor. Consequently, in the present embodiment, the saturation is suppressed while hue is prevented from being affected.

Figure 7:
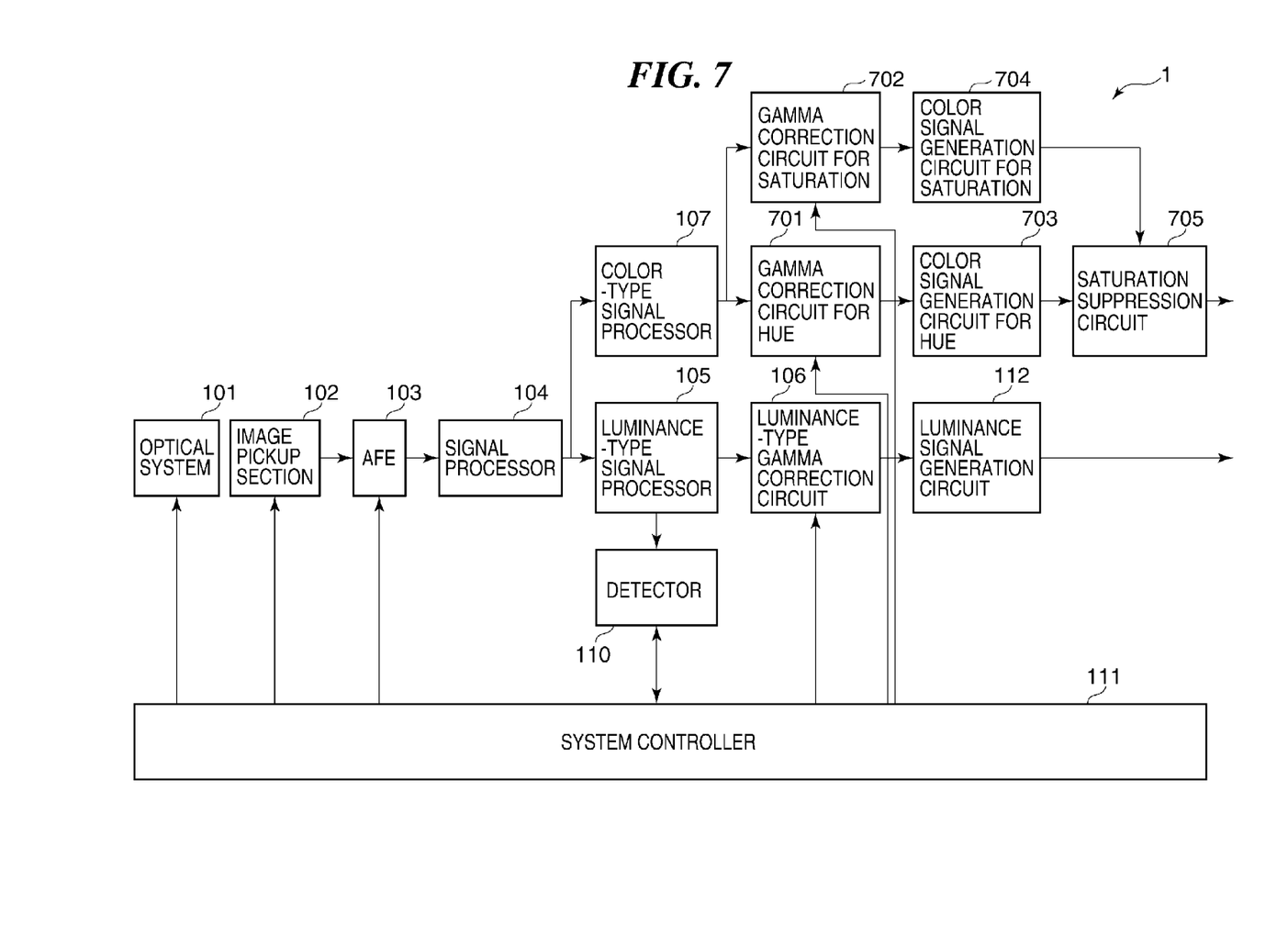
FIG. 7 is a block diagram showing a schematic configuration of the digital video camera according to a second embodiment.

FIG. 7 is a block diagram showing a schematic configuration of a digital video camera 1' according to a second embodiment. Component parts shown in FIG. 7 corresponding to those in FIG. 1 are assigned the same reference numerals, and descriptions thereof are herein omitted. The digital video camera 1' according to the present embodiment further includes a gamma correction circuit for hue 701 that functions as a third nonlinearization unit, a gamma correction circuit for saturation 702, a color signal generation circuit for hue 703, a color signal generation circuit for saturation 704, and a saturation suppression circuit 705.

A flow of the nonlinear characteristic selection performed in the system controller is similar to FIG. 9 shown in the first embodiment, and thus the flow is omitted. However, the second nonlinear characteristic selected in the present embodiment is set to the gamma correction circuit for saturation 702.

The image data that has passed through the processing in the color-type signal processor 107 is transmitted to each of the gamma correction circuit for hue 701 and the gamma correction circuit for saturation 702. The nonlinear characteristic to be set to the luminance-type gamma correction circuit 106 in the present embodiment is assumed to be similar to the first embodiment. The nonlinear characteristic to be set to the gamma correction circuit for saturation 702 can be similar to the nonlinear characteristic to be set to the color-type gamma correction circuit 108 in the first embodiment.

Figure 8:
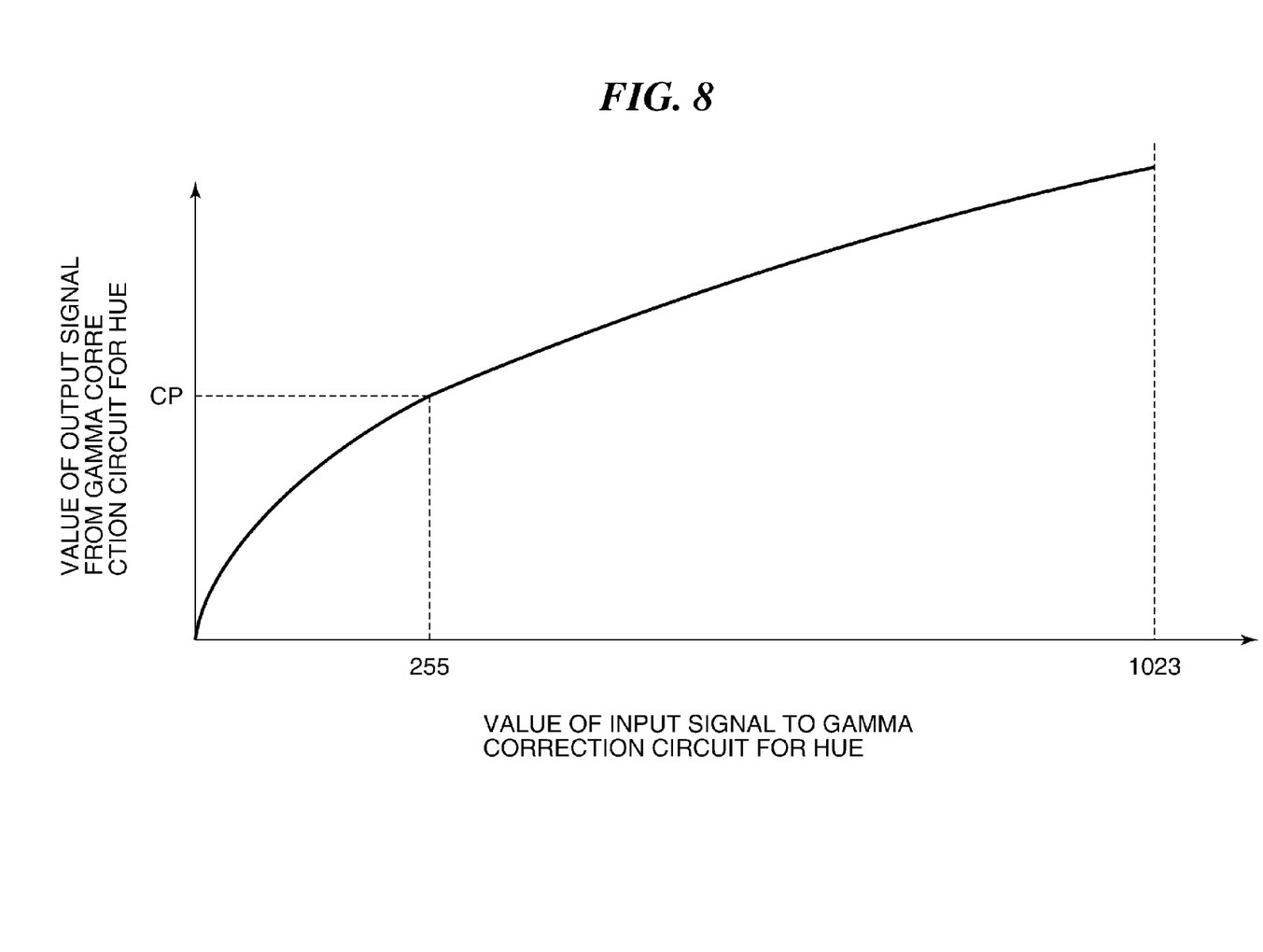
FIG. 8 is a diagram showing an example of a nonlinear characteristic to be set to a gamma correction circuit for hue of the digital video camera of FIG. 7.

The gamma correction circuit for hue 701 applies the nonlinear conversion to a signal that determines the hue. A nonlinear characteristic (third nonlinear characteristic) used in the nonlinear conversion by the gamma correction circuit for hue 701 is set by the system controller 111. FIG. 8 is a diagram showing an example of the nonlinear characteristic to be set to the gamma correction circuit for hue 701 of the digital video camera 1' of FIG. 7. In the present embodiment, it is assumed that the nonlinear characteristic to be set to the gamma correction circuit for hue 701 is a characteristic close to the inverse gamma characteristic of the monitor, and that a constant nonlinear characteristic is always set to the gamma correction circuit for hue 701 regardless of the setting in the luminance-type gamma correction circuit 106. Here, the same nonlinear characteristic is given to each signal of RGB inputted to and outputted from the gamma correction circuit for hue 701.

An output (RGB signal) from the gamma correction circuit for hue 701 is transmitted to the color signal generation circuit for hue 703, and an output (RGB signal) from the gamma correction circuit for saturation 702 is transmitted to the color signal generation circuit for saturation 704. Each of the color signal generation circuit for hue 703 and the color signal generation circuit for saturation 704 generates a Pb signal and a Pr signal from the received RGB signal, and transmits the Pb signal and the Pr signal to the saturation suppression circuit 705.

Here, the Pb signal and the Pr signal that are outputted from the color signal generation circuit for hue 703 are denoted as Pb1 and Pr1, respectively, and the Pb signal and the Pr signal that are outputted from the color signal generation circuit for saturation 704 are denoted as Pb2 and Pr2, respectively. The saturation suppression circuit 705 suppresses Pb1 and Pr1 at the same ratio. A value to be multiplied in the suppression is $(Pb2^2+Pr2^2)^{0.5}/(Pb1^2+Pr1^2)^{0.5}$. In this way, signals in which Pb1 and Pr1 are multiplied by this value are outputted as the Pb signal and the Pr signal, from the saturation suppression circuit 705.

The saturation can be suppressed to be nearly constant while the hue is maintained, by obtaining the Pb signal and the Pr signal by the above described method of the present embodiment. Moreover, even if a variation occurs in the nonlinear characteristic of the luminance-type gamma correction circuit 106, the saturation can be generally similarly suppressed with respect to the luminance output.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-266975, filed Nov. 30, 2010, which is hereby incorporated by reference herein in their entirety.

What is claimed is:

1. An image processing apparatus comprising:
    a first nonlinearization unit adapted to perform nonlinear conversion of a signal that has been generated from image data to determine luminance with a first nonlinear characteristic;
    a second nonlinearization unit adapted to perform nonlinear conversion of a signal that has been generated from the image data to determine saturation with a second nonlinear characteristic; and
    a control unit adapted to:
    set the first nonlinear characteristic and the second nonlinear characteristic to said first nonlinearization unit and said second nonlinearization unit, respectively;
    set a predetermined output ratio of the first nonlinear characteristic to the second nonlinear characteristic; and
    select, upon setting the first nonlinear characteristic to said first nonlinearization unit, the second nonlinear characteristic to be set to said second nonlinearization unit satisfying the predetermined output ratio.

2. The image processing apparatus according to claim 1, further comprising:
    a calculating unit adapted to generate a luminance signal from the image data, and calculate a signal amount of the luminance signal exceeding a predetermined threshold,
    wherein said control unit is further adapted to select the first nonlinear characteristic to be set to said first nonlinearization unit from among a plurality of predetermined nonlinear characteristics.

3. The image processing apparatus according to claim 1, further comprising:
    a third nonlinearization unit adapted to perform nonlinear conversion of a signal that has been generated from the image data and determine hue, with a third nonlinear characteristic,
    wherein said control unit is further adapted to set a predetermined constant nonlinear characteristic that is independent of the first nonlinear characteristic, and to set the predetermined constant nonlinear characteristic as the third nonlinear characteristic to said third nonlinearization unit.

4. An image processing method implemented in an image processing apparatus comprising an image pickup unit and a control unit, the method comprising:
    a step of obtaining a subject image as image data by said image pickup unit;
    a calculating step of generating a luminance signal from the image data, and calculating a signal amount of the luminance signal exceeding a predetermined threshold;
    a first selecting step of selecting a first nonlinear characteristic from a plurality of predetermined nonlinear characteristics;
    a first nonlinearization step of performing nonlinear conversion of a signal that has been generated from the image data to determine luminance, with the selected first nonlinear characteristic;
    an output ratio setting step of setting a predetermined output ratio of the first nonlinear characteristic to the second nonlinear characteristic;
    a second selecting step of selecting a second nonlinear characteristic, upon selecting the first nonlinear characteristic in said first selecting step, that satisfies the predetermined output ratio set in said output ratio setting step; and
    a second nonlinearization step of performing nonlinear conversion of a signal that has been generated from the image data to determine saturation, with the selected second nonlinear characteristic.

* * * * *